US006427379B1

(12) United States Patent
Lehner

(10) Patent No.: US 6,427,379 B1
(45) Date of Patent: Aug. 6, 2002

(54) PLANT POT WITH TRANSPLANTING FACILITATOR

(76) Inventor: Mark Lehner, 15722 Mayall St., North Hills, CA (US) 11535

( * ) Notice: Subject to any disclaimer, the term of this patent is extended or adjusted under 35 U.S.C. 154(b) by 0 days.

(21) Appl. No.: 09/844,598

(22) Filed: Apr. 27, 2001

(51) Int. Cl.[7] ................................................. A01G 9/02
(52) U.S. Cl. ............................................ 47/66.1; 47/73
(58) Field of Search .................................. 47/66.1, 66.2, 47/73, 65.7, 65.5, 66.5, 66.4, 66.3, 32.7, 76, 41.01, 65.8, 77; D11/148

(56) References Cited

U.S. PATENT DOCUMENTS

| | | | | |
|---|---|---|---|---|
| 1,031,713 A | * | 7/1912 | Hills | 47/73 |
| 2,968,124 A | * | 1/1961 | Coplen | 47/73 |
| 3,313,333 A | * | 4/1967 | Lordi | 220/666 |
| D226,279 S | * | 2/1973 | Byerly | D11/148 |
| 4,223,480 A | * | 9/1980 | Welty | 47/73 |
| 5,359,809 A | * | 11/1994 | Johnson | 47/73 |
| 5,605,012 A | * | 2/1997 | Weder et al. | 47/64 |
| 6,088,962 A | * | 7/2000 | Johnson | 47/73 |
| 6,195,938 B1 | * | 3/2001 | Kay | 47/77 |

* cited by examiner

Primary Examiner—Peter M. Poon
Assistant Examiner—Son T. Nguyen
(74) Attorney, Agent, or Firm—Goldstein & Lavas, P.C.

(57) ABSTRACT

A plant pot with transplanting facilitator including a container having an open upper end, an open lower end, and an intermediate surrounding side wall therebetween. The open lower end has a plate removably positioned therein. The plate has a central drainage aperture therethrough. The side wall has a longitudinal expansion slot extending between the open upper end and the open lower end. A longitudinal strip is removably disposed within the longitudinal expansion slot of the container. The longitudinal strip has an upper end and a lower end.

3 Claims, 3 Drawing Sheets

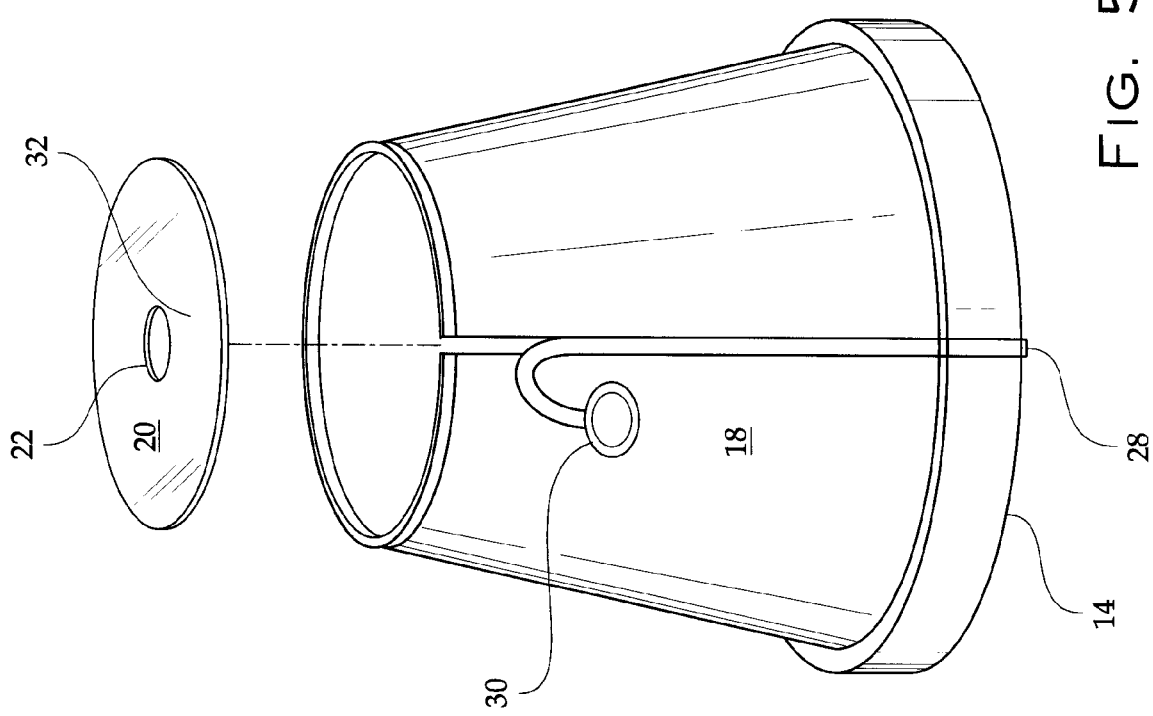

PLANT POT WITH TRANSPLANTING FACILITATOR

BACKGROUND OF THE INVENTION

The present invention relates to a plant pot with transplanting facilitator and more particularly pertains to allowing a potted plant to easily be replanted.

The use of plant receptacles is known in the prior art. More specifically, plant receptacles heretofore devised and utilized for the purpose of holding plants are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,662,490 to Childs discloses a pair of hinged shells forming a cylindrical enclosure capable of being opened to transplant trees. U.S. Pat. No. 4,223,480 to Welty discloses a flexible liner for the inside of a plant pot capable of being parted for repotting. U.S. Pat. No. 357,197 to Harsin and U.S. Pat. No. 4,249,344 to Pratt disclose additional containers suited for transplanting plants.

While these devices fulfill their respective, particular objective and requirements, the aforementioned patents do not describe a plant pot with transplanting facilitator for allowing a potted plant to easily be replanted.

In this respect, the plant pot with transplanting facilitator according to the present invention substantially departs from the conventional concepts and designs of the prior art, and in doing so provides an apparatus primarily developed for the purpose of allowing a potted plant to easily be replanted.

Therefore, it can be appreciated that there exists a continuing need for a new and improved plant pot with transplanting facilitator which can be used for allowing a potted plant to easily be replanted. In this regard, the present invention substantially fulfills this need.

SUMMARY OF THE INVENTION

In the view of the foregoing disadvantages inherent in the known types of plant receptacles now present in the prior art, the present invention provides an improved plant pot with transplanting facilitator. As such, the general purpose of the present invention, which will be described subsequently in greater detail, is to provide a new and improved plant pot with transplanting facilitator which has all the advantages of the prior art and none of the disadvantages.

To attain this, the present invention essentially comprises a cylindrical container having an open upper end, an open lower end, and an intermediate cylindrical side wall therebetween. The open lower end has a circular plate removably positioned therein. The circular plate has a central drainage aperture therethrough. The cylindrical side wall has a longitudinal expansion slot extending between the open upper end and the open lower end. An annular metal strip is removably disposed between the circular plate and the open lower end of the cylindrical container. The annular metal strip has a free end with a ring secured thereto. The ring is coupled with the circular plate in a closed orientation. A longitudinal metal strip is removably disposed within the longitudinal expansion slot of the cylindrical container. The longitudinal metal strip has an upper end and a lower end. The lower end has a ring secured thereto. The ring is coupled with the circular plate positioned within the open lower end of the cylindrical container in a closed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant pot with transplanting facilitator which has all the advantages of the prior art plant receptacles and none of the disadvantages.

It is another object of the present invention to provide a new and improved plant pot with transplanting facilitator which may be easily and efficiently manufactured and marketed.

It is a further object of the present invention to provide a new and improved plant pot with transplanting facilitator which is of durable and reliable construction.

An even further object of the present invention is to provide a new and improved plant pot with transplanting facilitator which is susceptible of a low cost of manufacture with regard to both materials and labor, and which accordingly is then susceptible of low prices of sale to the consuming public, thereby making such a plant pot with transplanting facilitator economically available to the buying public.

Even still another object of the present invention is to provide a new and improved plant pot with transplanting facilitator for allowing a potted plant to easily be replanted.

Lastly, it is an object of the present invention to provide a new and improved plant pot with transplanting facilitator including a container having an open upper end, an open lower end, and an intermediate surrounding side wall therebetween. The open lower end has a plate removably positioned therein. The plate has a central drainage aperture therethrough. The side wall has a longitudinal expansion slot extending between the open upper end and the open lower end. A longitudinal strip is removably disposed within the longitudinal expansion slot of the container. The longitudinal strip has an upper end and a lower end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded perspective view of the present invention.

DESCRIPTION OF THE PREFERRED EMBODIMENT

Figure 2:
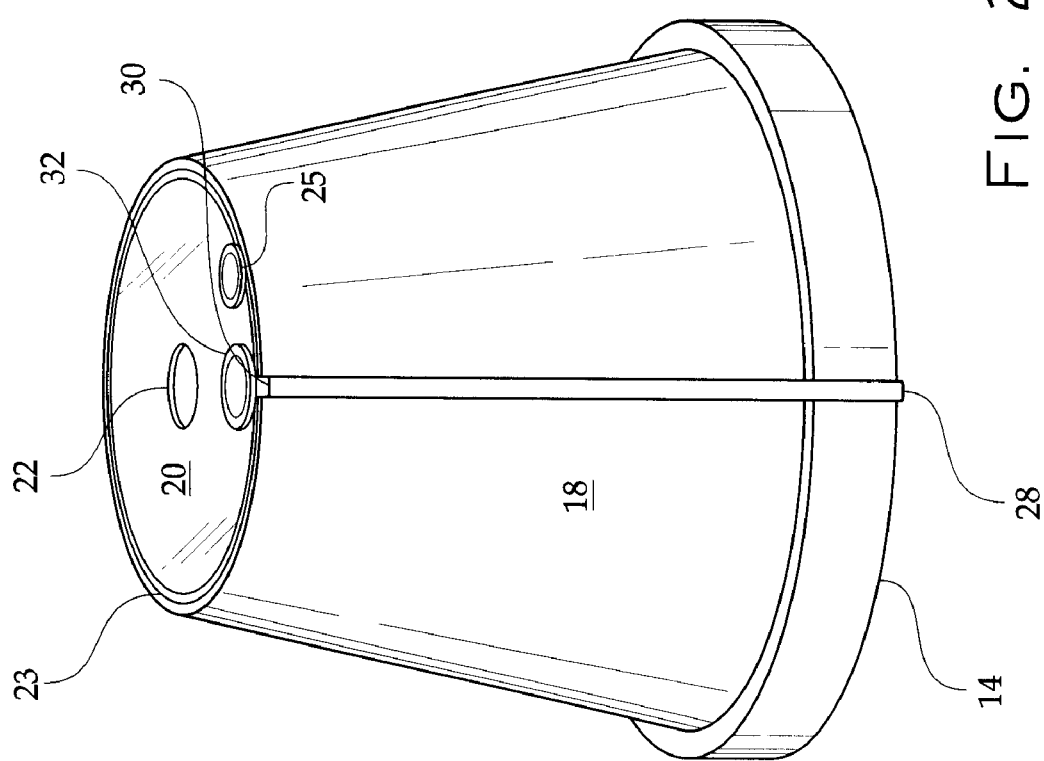
FIG. 2 is a bottom perspective view of the present invention.
Figure 1:
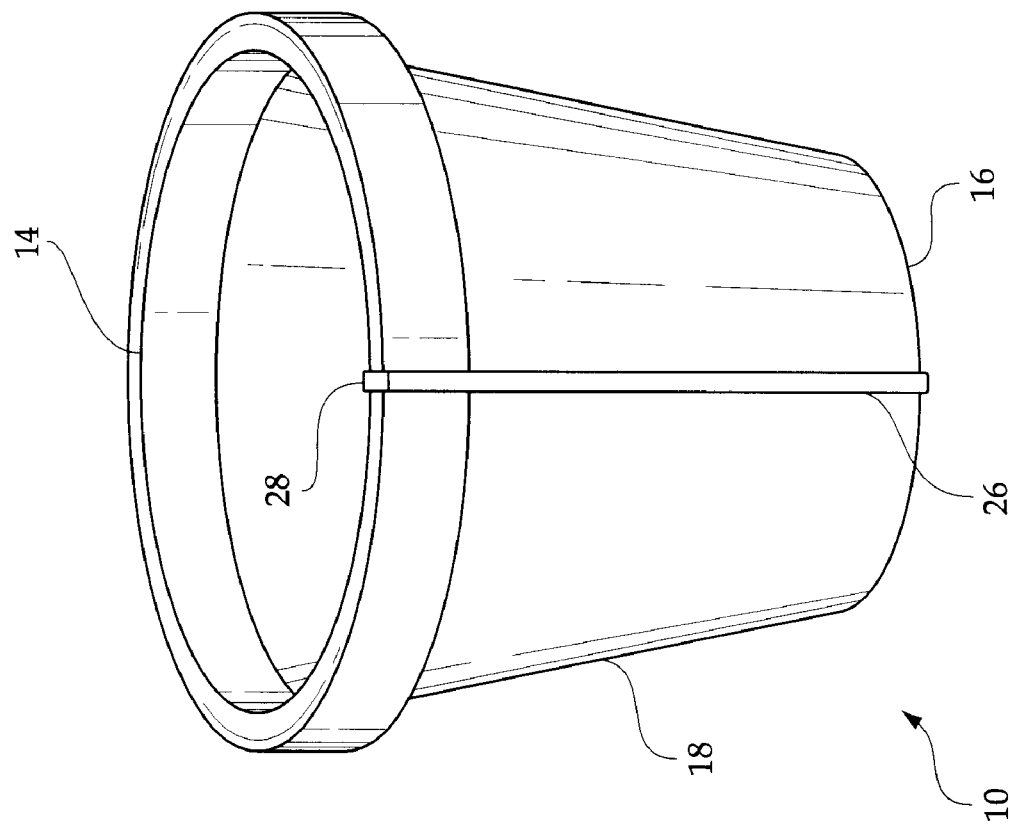
FIG. 1 is a perspective view of the preferred embodiment of the plant pot with transplanting facilitator constructed in accordance with the principles of the present invention.
Figure 4:
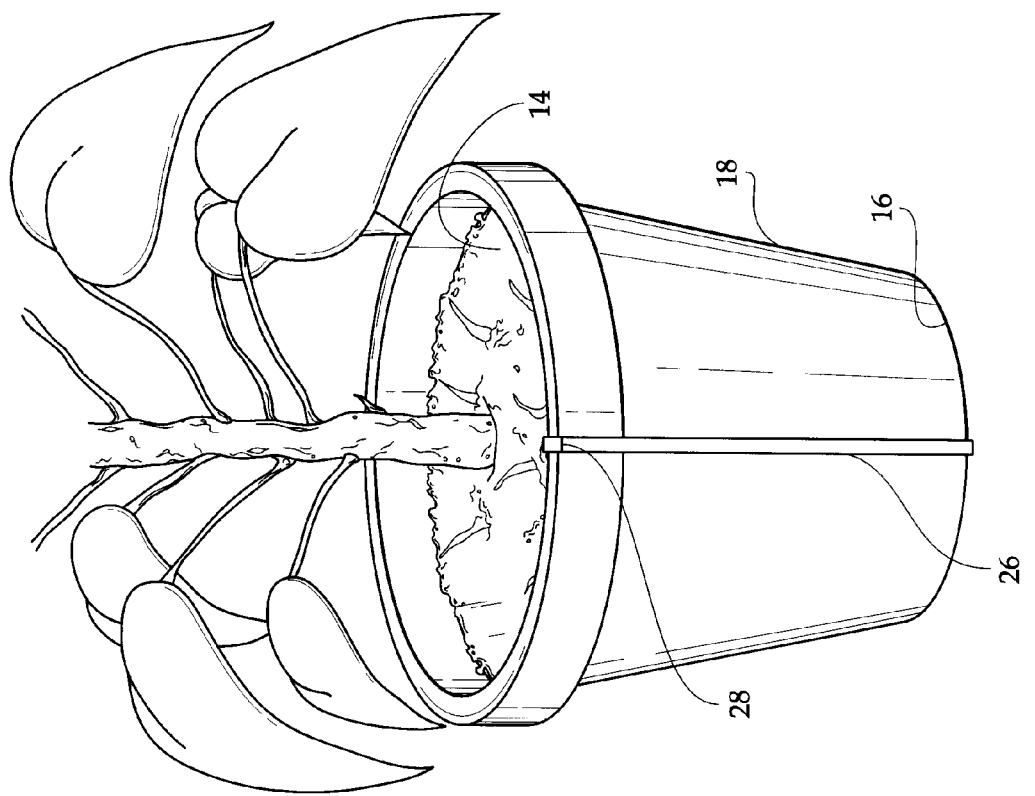
FIG. 4 is a perspective view of the present invention illustrated in use.
Figure 3:
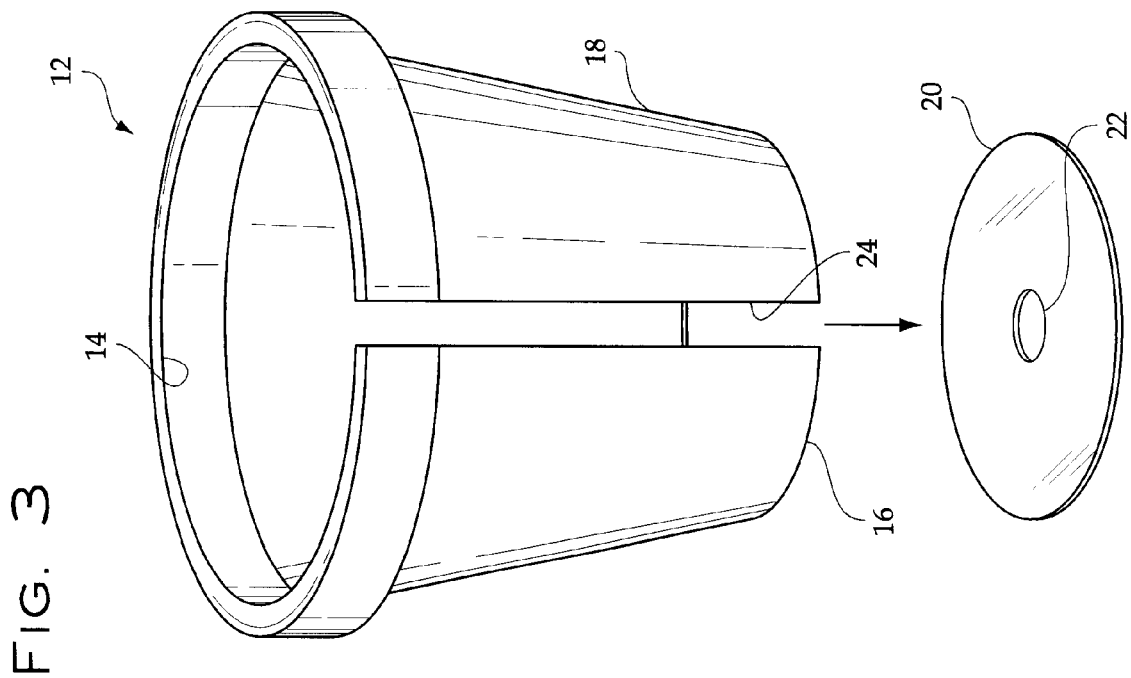
FIG. 3 is an exploded perspective view of the present invention.

With reference now to the drawings, and in particular, to FIGS. 1 through four thereof, the preferred embodiment of the new and improved plant pot with transplanting facilitator embodying the principles and concepts of the present invention and generally designated by the reference number 10 will be described.

Specifically, it will be noted in the various Figures that the device relates to a plant pot with transplanting facilitator for allowing a potted plant to easily be replanted. In its broadest context, the device consists of a cylindrical container, an annular metal strip, and a longitudinal metal strip. Such components are individually configured and correlated with respect to each other so as to attain the desired objective.

The cylindrical container 12 has an open upper end 14, an open lower end 16, and an intermediate cylindrical side wall 18 therebetween. The open lower end 16 has a circular plate 20 removably positioned therein. The circular plate 20 has a central drainage aperture 22 therethrough. The cylindrical side wall 18 has a longitudinal expansion slot 24 extending between the open upper end 14 and the open lower end 16.

The annular metal strip 23 is removably disposed between the circular plate 20 and the open lower end 16 of the cylindrical container 12. The annular metal strip 23 has a free end with a ring 25 secured thereto. The ring 25 is coupled with the circular plate 20 in a closed orientation.

The longitudinal metal strip 26 is removably disposed within the longitudinal expansion slot 24 of the cylindrical container 12. The longitudinal metal strip 26 has an upper end 28 and a lower end 30. The lower end 30 has a ring 32 secured thereto to facilitate removal of the longitudinal metal strip 26. The ring 32 is coupled with the circular plate 20 positioned within the open lower end 16 of the cylindrical container 12 in a closed orientation.

The present invention will allow a plant that has grown too large for the container 12 to be replanted either in a larger container or in the ground. The process requires the removal of the ring's 25,32 from the plate 20 in order to remove the longitudinal strip 26 from the longitudinal expansion slot 24 and the annular metal strip 23 from between the circular plate 20 and the open lower end 16 of the cylindrical container 12. The rings 25,32 are essentially snap-engaged to the plate 20 and can be simply pulled back in a manner similar to old style soda cans that utilized a pull ring. Next, remove the plate 20 from the open lower end 16 of the container 12 which is now allowed because of the removal of the annular metal strip 23. Position the container 12 in a larger opening, either a larger container or a hole in the ground. Lastly, expand the container 12 by spreading the longitudinal expansion slot 24 to allow the plant to be easily removed from the container 12 and properly positioned within the larger opening.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A plant pot with transplanting facilitator for allowing a potted plant to easily be replanted comprising, in combination:

a cylindrical container having an open upper end, an open lower end, and an intermediate cylindrical side wall therebetween, the open lower end having a circular plate removably positioned therein, the circular plate having a central drainage aperture therethrough, the cylindrical side wall having a longitudinal expansion slot extending between the open upper end and the open lower end;

an annular strip removably disposed between the circular plate and the open lower end of the cylindrical container, the annular strip having a free end with a ring secured thereto, the ring being coupled with the circular plate in a closed orientation; and a longitudinal strip removably disposed within the longitudinal expansion slot of the cylindrical container, the longitudinal strip having an upper end and a lower end, the lower end having a ring secured thereto, the ring being coupled with the circular plate positioned within the open lower end of the cylindrical container in a closed orientation.

2. A plant pot with transplanting facilitator for allowing a potted plant to easily be replanted comprising, in combination:

a container having an open upper end, an open lower end, and an intermediate surrounding side wall therebetween, the open lower end having a plate removably positioned therein, the plate having a central drainage aperture therethrough, the side wall having at least one longitudinal expansion slot extending between the open upper end and the open lower end; and a longitudinal strip removably disposed within the at least one longitudinal expansion slot of the container, the longitudinal strip having an upper end and a lower end, the lower end having a ring secured thereto, the ring being coupled with the plate positioned within the open lower end of the container in a closed orientation.

3. A method for allowing a potted plant to easily be replanted comprising, in combination:

providing a container having an open upper end, an open lower end, and an intermediate surrounding side wall therebetween for receiving a plant therein, the open lower end having a plate removably positioned therein, the plate having a central drainage aperture therethrough, the side wall having at least one longitudinal expansion slot extending between the open upper end and the open lower end, the container having a longitudinal strip removably disposed within the at least one longitudinal expansion slot of the container, the longitudinal strip having an upper end and a lower end, the lower end of the longitudinal strip has a ring secured thereto, the ring being coupled with the plate positioned within the open lower end of the container in a closed orientation;

removing the ring from the plate;

removing the plate from the open lower end of the container;

positioning the container in a larger opening;

removing the longitudinal strip from the longitudinal expansion slot; and expanding the container to allow the plant to be separated therefrom for positioning within the larger opening.

* * * * *